United States Patent [19]

Queiser et al.

[11] 3,986,839

[45] Oct. 19, 1976

[54] FLOW-GUIDING DEVICE FOR A CATALYTIC CONVERTER

[75] Inventors: Horst Queiser, Hochstadt; Horst Schwarz, Wiesbaden; Volker Tiegs; Horst Sitter, both of Frankfurt am Main, all of Germany

[73] Assignee: Licentia Patent-Verwaltungs-G.m.b.H., Frankfurt, Germany

[22] Filed: Jan. 8, 1974

[21] Appl. No.: 431,789

[30] Foreign Application Priority Data

Jan. 11, 1973   Germany............................ 2300695
Jan. 11, 1973   Germany............................ 7300516

[52] U.S. Cl. ............................... 23/288 R; 55/465
[51] Int. Cl.² .......................... B01J 8/00; B01J 8/02
[58] Field of Search....................... 23/288 F, 288 R; 55/307, 418, 465, DIG. 4D; 261/95, 97, 98, 94

[56] References Cited

UNITED STATES PATENTS

| | | | |
|---|---|---|---|
| 2,127,561 | 8/1938 | Herrmann | 23/288 R |
| 2,263,363 | 11/1941 | Menshih | 23/288 R |
| 2,979,313 | 4/1961 | Eckert | 261/94 |
| 2,979,314 | 4/1961 | Eckert | 261/94 |
| 2,979,315 | 4/1961 | Eckert | 261/94 |
| 3,112,256 | 11/1963 | Young et al. | 23/288 R |
| 3,146,189 | 8/1964 | Kunreuther et al. | 23/288 R |
| 3,189,418 | 6/1965 | Gary | 23/288 F |
| 3,595,626 | 7/1971 | Sowards | 261/94 X |
| 3,597,166 | 8/1971 | Hochman | 23/288 R |
| 3,649,215 | 3/1972 | Perga et al. | 23/288 F |
| 3,707,831 | 1/1973 | Dautzeuberg et al. | 23/288 F |
| 3,738,088 | 6/1973 | Coldsiimo | 23/288 R X |

FOREIGN PATENTS OR APPLICATIONS 444,898   3/1936   United Kingdom............. 23/288 R Primary Examiner—Morris O. Wolk
Assistant Examiner—Bradley R. Garris
Attorney, Agent, or Firm—Spencer & Kaye

[57] ABSTRACT

In a catalytic converter which has a housing, gas inlet and outlet nipples in the housing, a screen positioned in and held by said housing for supporting a loose catalyst material thereon and a free space provided in the housing above the loose catalyst material, there is provided a flow-directing device for guiding a stream, after its introduction into the housing through the gas inlet nipple, onto the loose catalyst uniformly and vertically from above.

4 Claims, 3 Drawing Figures

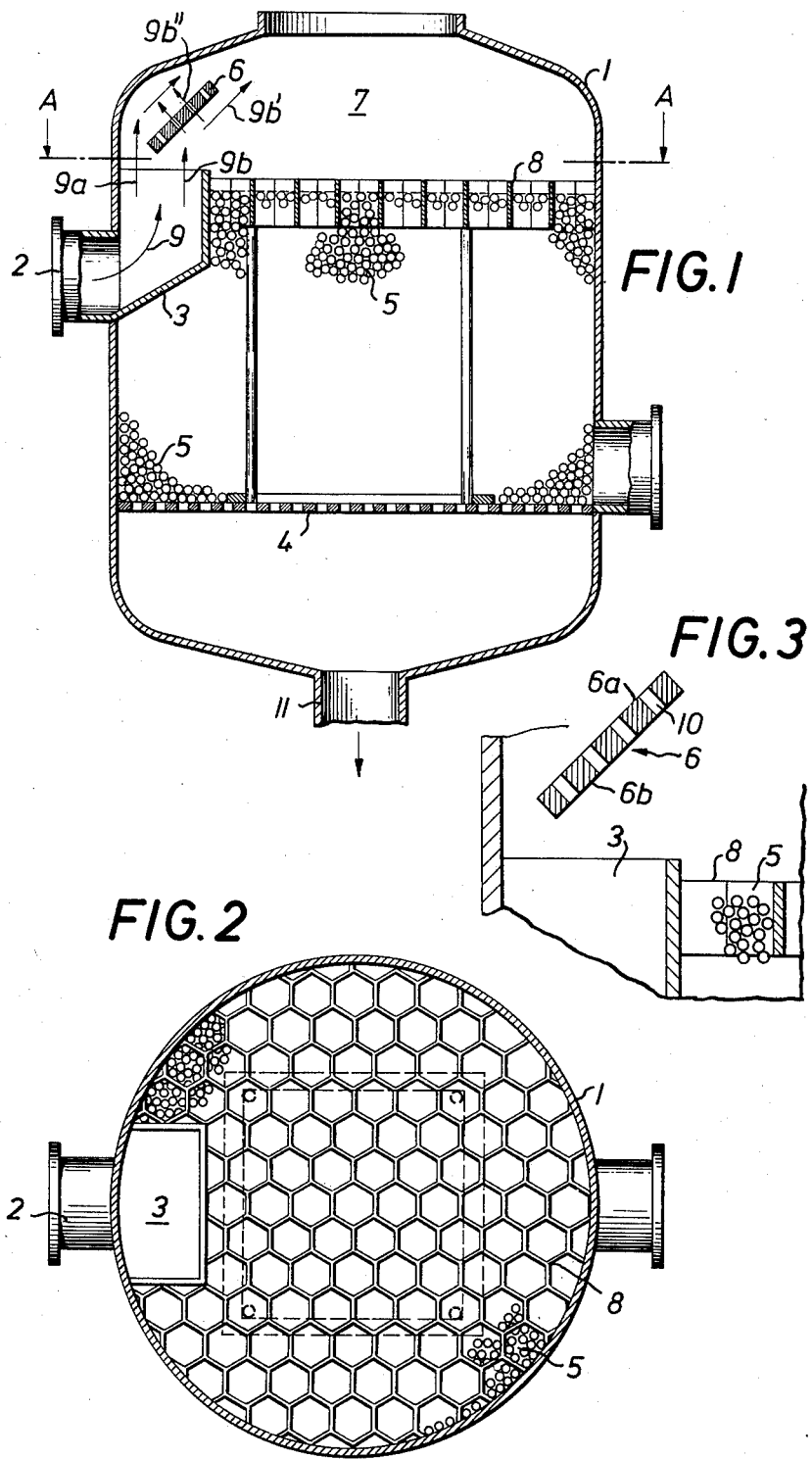

FLOW-GUIDING DEVICE FOR A CATALYTIC CONVERTER

BACKGROUND OF THE INVENTION

This invention relates to catalytic converters including a housing through which gases are passed and a loose catalyst material contained in the housing and contacted by the gases. The invention may find particular application in converters which, by virtue of catalytic combustion, recombine waste gases obtained during the operation of nuclear power plants. The waste gases obtained during the operation of nuclear power plants contain mostly (approximately 90°) oxygen and hydrogen (radiolysis gases).

The entire quantity of waste gases, prior to its release into the atmosphere, has to be introduced to a processing plant for removing or delaying the radioactive matter it contains. Since the dimensions of this plant depend upon the quantity of the waste gases, it is a desideratum to decrease the waste gas quantities prior to their processing. For this purpose, the waste gases are passed through a converter in which the radiolysis gases are submitted to a catalytic combusion and are thus converted to water.

Such a converter — hereinafter referred to as a "recombiner" — usually comprises a housing with a lateral or central gas inlet nipple and a usually centrally arranged outlet nipple. In the housing, there is situated a grid-like intermediate floor (screen) which supports a loose catalyst mass constituted of small spheres or cylinders having a diameter of approximately 3 – 8 millimeters. The waste gases obtained during the operation of the nuclear power plant are generally drawn from the turbine condenser by means of vapor jet pumps. Subsequently, the waste gases are introduced, together with the carrier vapor, into the recombiner by first passing them through a dehydrator and preheater. The vapor-gas mixture introduced into the recombiner housing through the inlet nipple first encounters an inlet skirt which deflects the mixture stream into the upper free space of the housing. Then the mixture stream, deflected by the inner face of the housing top, proceeds downwardly and contacts the catalyst. It has been found that during the operation of such a system, unfavorable conditions arise as the flow is formed in the upper housing portion. Under certain flow velocities, the stream, which laterally impinges upon the catalysts, sets the catalyst particles in motion and thus shifts the loose catalyst mass, whereby hills and valleys are formed therein. These, because of the thus obtained different throughflow resistances of the catalyst mass, cause a non-uniform contacting between the vapor-gas mixture and the catalysts. Further, the above-noted motion of the loose catalyst material causes an abrasion thereof and thus reduces the quantity of the catalyst particles and increases pressure losses due to dust deposits. Also, the catalyst bodies tend to be destroyed as the incoming vapor-gas mixture carries them away and hurls them against the housing wall. All these phenomena have an unfavorable effect on the efficiency of the recombiner.

SUMMARY OF THE INVENTION

It is an object of the invention to provide an improved recombiner of the above-described type from which the discussed disadvantages are eliminated.

This object and others to become apparent as the specification progresses, are accomplished by the invention, according to which, briefly stated, in the housing space above the loose catalyst material flow-guiding means are provided in such a manner that the loose catalyst material is contacted by the stream uniformly and vertically from above.

The advantages of the invention reside in an improvement of the efficiency of the recombiner because of the larger throughputs which are made possible by virtue of a more uniform contacting of the loose catalyst material and by virtue of the gentle handling of the loose catalyst material during operation which manifests itself in a prolonged life of the catalysts.

BRIEF DESCRIPTION OF THE DRAWINGS

FIG. 1 is a schematic sectional side elevational view of a preferred embodiment of the invention.

FIG. 2 is a sectional view taken along line A—A of FIG. 1. FIG. 3 is a schematic sectional side elevational view on an enlarged scale of a detail of FIG. 1.

DESCRIPTION OF THE PREFERRED EMBODIMENT

Turning now to the Figures, the recombiner comprises a housing 1 having an inlet nipple 2, continuing within the housing, in an elbow conduit 3. In the housing 1, there is provided a support screen 4 onto which there is poured the catalyst 5 formed of small spheres or cylinders. Above the elbow conduit 3, there is disposed a perforated baffle 6 which may be secured to the housing 1 by any suitable means. The baffle 6 is so positioned above the open elbow conduit 3 that the vapor-gas mixture flowing into the housing 1 in the direction of the arrow 9 is divided into two partial streams 9a and 9b. The partial streams 9a and 9b flow along the upper and lower faces 6a and 6b, respectively, of the baffle plate 6. The purpose of the throughgoing apertures 10 in the baffle plate 6 is to divide the partial stream 9b into further partial streams 9b' and 9b''. The partial stream 9b' continues to flow along the lower face 6b of the baffle 6 and advances towards the free upper space 7 inside the housing 1. The partial stream 9b'' of the vapor-gas mixture passes through the apertures 10 and thus constitutes a flow which is transversal to the partial stream 9a flowing along the upper baffle plate face 6a. The transversal stream 9b'' causes a turbulence and a delay in the advance of the partial stream 9a towards the space 7. The two partial streams 9a and 9b' are united in the free space 7 above the loose catalyst material 5 and are, in their total effect, as it has been proved by tests, substantially more favorable than in prior art recombiners wherein the flow in the housing remains uncontrolled.

For a further improvement of the flow conditions, spaced above the catalyst 5 and immediately below the free space 7, there is disposed a honeycomb-like flow-guiding grid 8, the individual, open-ended cells of which are vertically oriented. It has been found advantageous to provide the catalyst 5 on the screen 4 in such a thick layer that the grid openings of the flow-guiding grid 8 are filled with the loose catalyst material 5 up to a predetermined height which depends on the type and magnitude of the discrete catalyst bodies. It has been found expendient to fill the honeycomb cells with the catalyst material to about 70% of their total height. The flow-guiding grid 8 causes, even if used by itself, but particularly in combination with the abovedescribed baffle plate 6, a substantially uniform and vertically downwardly directed advance of the mixture stream. Thus, the vapor-gas stream contacts the catalyst 5 in a uniformly distributed manner and from above, whereby a shift in the loose catalyst mass and the disadvantages inherent in such a displacement are securely avoided. Subsequent to the passage through the loose catalyst material 5, the stream may be withdrawn from the housing 1 through the outlet nipple 11.

It will be understood that the above description of the present invention is susceptible to various modifications, changes and adaptations, and the same are intended to be comprehended within the meaning and range of equivalents of the appended claims.

What is claimed is:

1. In a catalytic converter having a housing; gas inlet and outlet nipples provided in the housing; the gas inlet nipple being situated on the side of the housing; screen means positioned in and held by the housing for supporting a particulate catalyst material thereon; a free space provided in the housing above the catalyst material; and gas flow directing means disposed at least in part in the free space; the improvement wherein said gas flow directing means comprises in combination:
    a. flow deflecting means supported within said housing adjacent said inlet nipple for deflecting substantially upwardly the gas stream entering said housing through said inlet nipple;
    b. a flat baffle plate including opposite first and second faces and means defining throughgoing apertures therein; said baffle plate being disposed at an oblique angle to the vertical within said housing above said flow deflecting means in the path of the upwardly flowing gas stream; said baffle plate dividing said stream into first and second partial streams flowing, respectively, along the first and second faces of said baffle plate towards said free space, said baffle plate dividing said second partial stream into third and fourth partial streams, flowing, respectively, along said second face and through said apertures of said baffle plate; and
    c. a flow guiding grid formed of a plurality of vertically oriented, open-ended adjoining cells each defined by a tubular wall having a vertical length dimension for forming a vertically directed elemental gas stream; said flow-guiding grid extending substantially over the entire catalyst material for exposing the catalyst material to a uniformly distributed, solely vertically downwardly oriented gas flow.

2. A catalytic converter as defined in claim 1, said tubular wall of any one cell constituting a part of the tubular wall of a plurality of other cells adjoining said any one cell; each tubular wall having an upwardly oriented edge face of small width for effecting a small flow resistance.

3. A catalytic converter as defined in claim 1, wherein said cells are filled with said particulate catalyst material to a predetermined height of said cells.

4. A catalytic converter as defined in claim 3, wherein said height is about 70% of the height of said cells.

* * * * *